T. M. BRINTNALL.
DEMOUNTABLE RIM.
APPLICATION FILED APR. 29, 1919.

1,402,141. Patented Jan. 3, 1922.

WITNESS
J. B. Gardner

INVENTOR
T. M. BRINTNALL
BY White & Prost
HIS ATTORNEYS

UNITED STATES PATENT OFFICE.

THOMAS M. BRINTNALL, OF OAKLAND, CALIFORNIA, ASSIGNOR OF ONE-FOURTH TO J. FRANK HANLY, ONE-FOURTH TO CHARLES H. HANLY, AND ONE-FOURTH TO RAYMOND E. HANLY, ALL OF OAKLAND, CALIFORNIA.

DEMOUNTABLE RIM.

1,402,141.

Specification of Letters Patent. Patented Jan. 3, 1922.

Application filed April 29, 1919. Serial No. 293,424.

*To all whom it may concern:*

Be it known that I, THOMAS M. BRINTNALL, a citizen of the United States, and a resident of the city of Oakland, county of Alameda, and State of California, have invented a new and useful Demountable Rim, of which the following is a specification.

My invention relates to detachable and contractable rims for automobile tires.

An object of the invention is to provide a collapsible tire rim which is so constructed that it is held in expanded condition when in engagement with a tire, so that when released, it contracts and releases itself from the tire.

Another object of the invention is to provide a collapsible rim which is formed inherently to lie in the collapsed condition, so that it may be readily placed in a tire and expanded into engagement with the tire.

Another object of the invention is to provide a rim having but a single interruption of circumferential continuity when engaged with the tire.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Briefly stated my invention comprises a split rim which is inherently substantially involute in form and unbroken in structure. In its involute form, it is in a contracted position so that it may be readily disengaged from the tire and it must be expanded from this form to circular form in order that it may engage the tire. Means are provided for expanding the rim to circular form so as to engage the tire and to insure its retention in such engagement.

A detailed description of my invention follows:

The rim of my invention comprises a body 2 which may be made from a ring that corresponds in size and form to the rim in its expanded position. The ring is severed transversely at a single point on the circumference and then bent permanently into substantially involute form. In this manner the body of the rim has not been mutilated and will present but a single break of continuity when forced back to circular form to engage the tire 3.

Figure 1:
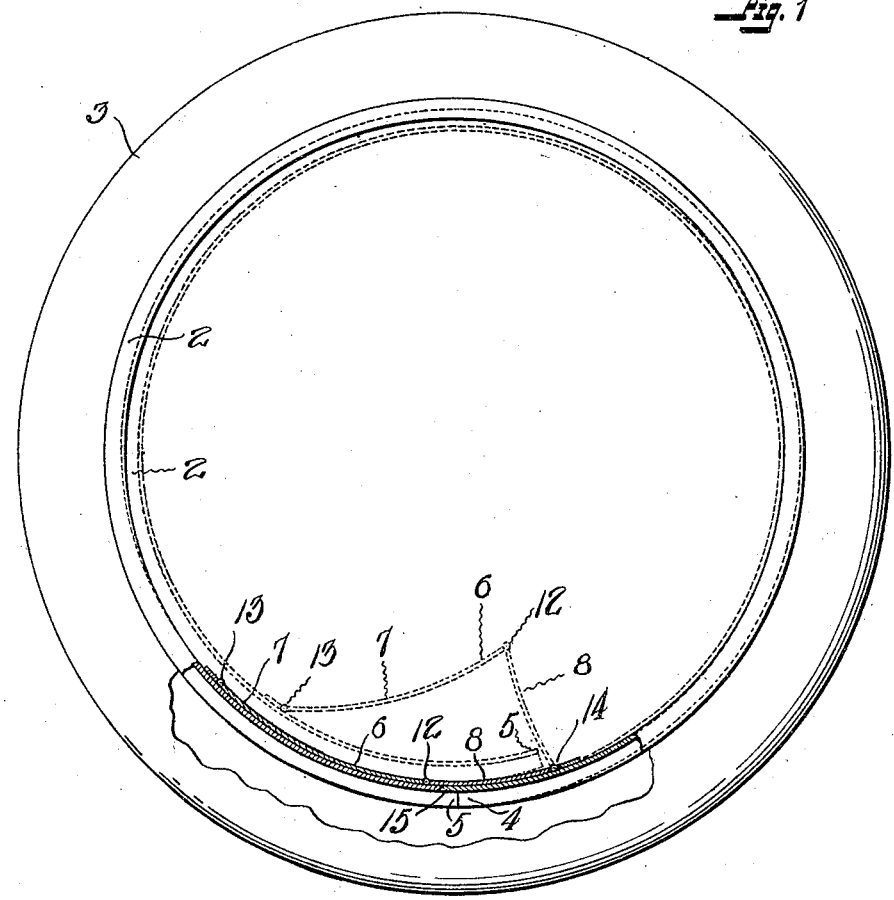
Figure 1 is a side elevation of the rim partly in section, showing the rim in engagement with a tire. The disengaged position of the rim is indicated by the dotted lines.
Figure 2:
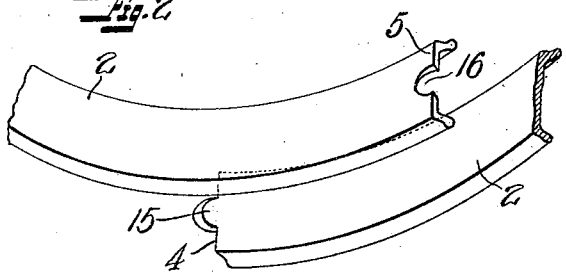
Figure 2 is a perspective view of the two ends of the rim in the position they assume when the rim is disengaged from the tire.
Figure 3:
Figure 3 is a side elevation of one of the toggle links.

As can be seen in Fig. 1 of the drawings, one end 4 of the rim retains a relatively substantially immobile position whether the rim is either in circular or involute form. The other end 5, which for convenience I shall hereafter term the active end, is circumferentially alined with the end 4 when the rim is in circular form, but extends inwardly from the end 4 when the rim resumes its involute form. The natural form of the rim being involute, the act of forcing it to assume circular form sets up a tension therein tending to force the rim to resume its involute form. However, due to peculiar relation that exists between the two ends of the rim, I am enabled to utilize this tension so that it will hold the rim in circular form as well as to facilitate the contraction of the rim. By referring to the drawing, it will be seen that when the rim is in the involute form, that the active end 4 is not only spaced inwardly from the end 5 but is overlapped considerably by the latter. In the present instance the distance which the end portions of the rim overlap each other when the rim is in the involute form, is about three times the distance that separates these portions radially. Accordingly, when the rim is expanded to circular form and the ends abut against each other, the force tending to retain the rim in circumferential alinement is considerably greater than that of the force tending to produce aberration.

As a result of this tendency to retain the rim in circular form or in other words retain the rim and tire in engagement, simple means of relatively light weight and strength may be employed to maintain this engagement positively. In the present embodiment of the invention, the means which are provided for forcing the rim from involute to circular form performs both its own function and that of maintaining the positive engagement of the rim and tire as well. This means comprises a toggle 6, provided with flexible links 7 and 8 preferably formed of a plurality of leaves 9. The links preferably vary in length, the larger link 7 being pivoted at its free end adjacent the active end 5 of the rim and the smaller link 8 is pivoted adjacent the immobile end 4 of the rim. When the rim is in the involute form the elbow 12 of the toggle extends inwardly and the outer ends of the links are comparatively close to each other. Pressure exerted on the toggle elbow in an outward direction forces the outer ends of the toggle to separate to effect the expansion of the rim and enables the links to lie flat against the inner sides of the rim in circular alinement therewith. During its movement outwardly the toggle elbow passes through an imaginary straight line drawn through the pivotal points 13 and 14 of the outer ends of the toggle. Consequently, the force obtaining in the rim when in circular form is transferred to the toggle, to positively maintain the rim in said form until released by an extraneous force. Of course, when the rim is in circular form and disposed upon a wheel, the inner face of the toggle links contact with the periphery of the wheel so that the rim cannot collapse under substantially any conditions.

The two links 7 and 8 are pivoted to the respective end portions of the rim in such relation that when the links lie flat against the sides of the rim, a portion of the link 8 will overlap part of the active end portion. In this manner, when an extraneous force is applied to the rim adjacent the active end 5, the said end is enabled to press against a point on the toggle that is comparatively close to one of the outer ends thereof, so that the toggle may be forced inwardly with a relatively small movement of the active end of the rim.

The link 7 of the toggle is made considerably longer than its mate, so that the active end of the rim will be forced into circumferential alinement with the other end, with a minimum amount of rubbing that may occur between the two overlapping ends of the rim and between the active end thereof and the tire.

The greatest expansion of the rim occurs when the elbow of the toggle lies in the line drawn through the pivotal points 13 and 14 of the toggle. As the elbow must continue moving outwardly before the toggle links aline themselves with the rim, the latter contracts slightly due to the shortening of the distance between the points 13 and 14. Since the size of this slightly-contracted position of the rim corresponds to that part of the tire which the rim engages, it is not practical to expand the rim to a size greater than that of the tire. To overcome this, the links of the toggle as previously mentioned are made flexible so that during the time that the elbow moves through the area adjacent the line, the links become flexed and the rim need not expand to a size greater than the tire which surrounds it.

Means are also provided for preventing lateral displacement of the rim ends when the rim is expanded. In the present form of the invention this means is provided by forming the immovable end 4 of the rim with an integral tongue 15 which is adapted to engage a notch 16 cut in the active end 5, when the ends abut against each other. The tongue and notch are preferably beveled at their edges so as to facilitate the initial engagement of the ends.

Probably most of the resistance offered to the disengagement of the rim and tire is caused by the "freezing" of the two. Ordinarily, in order to effect initial contraction, the rim must move in a circumferential path while practically still engaged with the tire before it is permitted to contract. With the rim of my invention, this action is substantially reversed. The freezing or rusting action is overcome by pulling the members apart instead of pushing them apart. This feature of my invention is, for the most part, due to the fact that when the rim is in its involute form, the active end 5 is naturally spaced inwardly for a relatively large distance. Consequently, when the rim is forced to circular form, a centripetal force of considerable power is set up in the rim, tending to cause it to resume its involute form. When the active end is manually released, the centripetal force which is greatest and is concentrated at the active end of the rim, will exert the greatest effort to effect disengagement of the rim and tire, at the very point where the disengagement must commence. After the contraction of the rim at the active end is started, the remainder of the rim follows in smooth order until complete disengagement with the tire results.

Throughout the specification and the claims the term "involute" has been used as best descriptive of the peculiar form of the retracted free rim. The rim when free has its ends in overlapped condition and position thus forming a spiral coil constantly and uniformly decreasing in distance peripherally from the axis or center of the rim. The curve of the spiral is of a substantially uniform rate of pitch that will most nearly approximate at every peripheral part, the radius of the tire to be held, so that there will be a minimum deflection or change of curvature from the spiral form to the true circular form conforming to the bead of a tire to be mounted on the rim.

I claim:

1. A demountable rim for wheel tires, comprising a one-piece, split, normally retrahent rim of involute form, when free, throughout its length, the coil being of uniform pitch toward the axis whereby when applied to a tire the rim is expanded with minimum and equal distortion and strain of its structure throughout its length.

2. A demountable rim for wheel tires, comprising a one-piece, split, normally retrahent rim of involute form, when free, throughout its length, the coil being of uniform pitch toward the axis whereby when applied to a tire the rim is expanded with minimum and equal distortion and strain of its structure throughout its length, and a pair of toggle links of unequal length attached each to an end of the rim.

3. A one-piece involute rim adapted to be expanded into circular form to carry a tire, a toggle link pivoted on the inner surface of the rim in such position as to project slightly across the respective end of the volute, and another link connected to the first link and connected to and lying wholly on the other end of the volute.

4. A one-piece involute rim adapted to be expanded into circular form to carry a tire, a short toggle link pivoted on the inner surface of the rim in such position as to project slightly across the respective end of the volute, and another longer link connected to the first link and connected to and lying wholly on the other end of the volute.

5. A one-piece split rim inherently substantially involute in form adapted to be forced to circular form and having a relatively substantially immobile end and a relatively active end, a link pivotally secured at one end to said rim adjacent the said immobile end, and a relatively longer link pivotally secured at one end to said rim adjacent said active end and pivotally secured to the first link at its other end.

In testimony whereof, I have hereunto set my hand at San Francisco, California, this 22nd day of April, 1919.

THOMAS M. BRINTNALL.

In presence of—
J. B. GARDNER,
W. W. HEALEY.